United States Patent
Graf

[11] Patent Number: 6,095,945
[45] Date of Patent: Aug. 1, 2000

[54] COMBINED ENGINE AND TRANSMISSION CONTROL FOR A MOTOR VEHICLE

[75] Inventor: Friedrich Graf, Regensburg, Germany

[73] Assignee: Siemens Aktiengesellschaft, Munich, Germany

[21] Appl. No.: 09/013,301

[22] Filed: Jan. 26, 1998

[30] Foreign Application Priority Data

Jan. 24, 1997 [DE] Germany ............................ 197 02 554

[51] Int. Cl.⁷ ........................... F16H 59/60; F16H 61/00; B60K 41/04
[52] U.S. Cl. .............................. 477/97; 477/110; 477/118
[58] Field of Search .............................. 477/97, 107, 110, 477/118, 183; 701/58, 65, 71

[56] References Cited

U.S. PATENT DOCUMENTS

| | | |
|---|---|---|
| 4,829,434 | 5/1989 | Karmel et al. . |
| 5,313,922 | 5/1994 | Demel . |
| 5,327,346 | 7/1994 | Goodell .............................. 364/426.02 |
| 5,411,452 | 5/1995 | Katayama ............................ 477/183 X |
| 5,415,600 | 5/1995 | Mochizuki et al. . |
| 5,514,046 | 5/1996 | Petersmann et al. ...................... 477/39 |
| 5,514,050 | 5/1996 | Bauerle et al. ......................... 477/97 X |
| 5,679,092 | 10/1997 | Otsubo et al. ............................. 477/97 |
| 5,716,301 | 2/1998 | Wild et al. ................................. 477/97 |
| 5,819,193 | 10/1998 | Burgdorf et al. ......................... 701/76 |
| 5,832,400 | 11/1998 | Takahashi et al. .................... 701/58 X |

FOREIGN PATENT DOCUMENTS

| | | |
|---|---|---|
| 0 745 788 A1 | 12/1996 | European Pat. Off. . |
| 4120603 A1 | 1/1993 | Germany ................................ 477/118 |
| 57-37142A | 1/1982 | Japan ..................................... 477/107 |
| 2 276 683 | 10/1994 | United Kingdom . |

OTHER PUBLICATIONS

Co–pending U.S. application filed Sep. 12, 1997, under Ser. No. 08/937,253 (Graf et al.), drive train control for a motor vehicle.

*Primary Examiner*—Charles A. Marmor
*Assistant Examiner*—Roger Pang
*Attorney, Agent, or Firm*—Herbert L. Lerner; Laurence A. Greenberg; Werner H. Stemer

[57] ABSTRACT

A combined engine and transmission control unit for a motor vehicle uses the position of the accelerator pedal to calculate setpoint values for the engine and the transmission of the motor vehicle. The control unit has a drive-train controller, which, when the engine is not in traction mode, controls the driving mode of the motor vehicle. The driving mode is adapted to the surroundings of the motor vehicle and the driving style of the driver. The drive-train controller activates an engine torque control when brake slip is detected, and the transmission controller prescribes a lower gear than is provided for the unbraked mode of the motor vehicle by a characteristic diagram.

8 Claims, 2 Drawing Sheets

COMBINED ENGINE AND TRANSMISSION CONTROL FOR A MOTOR VEHICLE

BACKGROUND OF THE INVENTION

FIELD OF THE INVENTION

The invention relates to a combined or integrated engine and transmission control, which utilizes a position of the accelerator pedal to calculate desired values for the engine and the transmission of the motor vehicle.

A drive-train control for a motor vehicle which uses the position of the accelerator pedal to calculate desired values for the engine and the transmission of the motor vehicle and which includes a calculation device, that receives signals proportional to the positions of the accelerator pedal and of the brake pedal and generates therefrom centralized control parameters for the drive train and the brake system of the motor vehicle, is described in a commonly assigned, copending application Ser. No. 08/937,253, filed Sep. 12, 1997. It is also known in the pertinent prior art to support braking processes initiated by the driver by increasing the transmission ratio, i.e., by shifting the transmission into a lower gear. However, this entails the risk of the driven wheels locking when there are slippery roads or generally low coefficients of friction between the tires and the road surface. If the braking process is not regulated by an anti-lock brake system (ABS), for example because the service brake is not active, the brake slip can lead to a loss of driving stability.

In a drive-train controller, of the generic type, use is made, inter alia, of the position of the accelerator pedal, the driving style of the driver, and the ambient conditions of the motor vehicle to calculate setpoints for the transmission of the motor vehicle (see, for example, DE-Z: Automobiltechnische Zeitschrift [Automobile Periodical] 97 (1995) 4, pp 220–224). These, and further influencing variables, affect solely the gear selection of the automatic transmission. The engine controller of the motor vehicle is not influenced by this.

Conventional engine torque controllers (ETC) bring about an increase in the engine torque and thus reduce the brake slip (DE-Z: Automobiltechnische Zeitschrift [Automobile Periodical] 98 (1996) 4, pp. 188–198), without involving the transmission controller.

On the other hand, there are situations in which the driver's wishes and the driving conditions are such that the engine is not in traction mode, i.e. it is not driving the motor vehicle, but it is expedient not to transmit any engine braking torque to the driven wheels.

SUMMARY OF THE INVENTION

It is accordingly an object of the invention to provide a combined engine and transmission control for a motor vehicle, which overcomes the above-mentioned disadvantages of the prior art devices and methods of this general type and which brings about greater safety and lower fuel consumption under driving conditions such as "engine braking", "overrun conditions", "coasting" etc.

With the foregoing and other objects in view there is provided, in accordance with the invention, a drive-train control system for a motor vehicle in which a position of an accelerator pedal is utilized to calculate setpoints for an engine and a transmission of the motor vehicle, the control system comprising:

a combined control unit for an engine and a transmission of a motor vehicle; the control unit being programmed to, when the engine is not in traction mode, adapt a driving mode of the motor vehicle to surroundings of the motor vehicle and to a driving style of the driver; and an engine torque control device, the device being programmed to activate an engine torque controller when a brake slip is detected, and a transmission controller prescribes a lower gear than a gear predetermined according to a characteristic diagram for an unbraked drive mode of the motor vehicle.

In accordance with an added feature of the invention, a brake controller connected to the transmission controller outputs a signal indicating an occurrence of a brake slip to the transmission controller.

In accordance with an additional feature of the invention, the transmission controller receives a plurality of sensor signals from the motor vehicle, and the transmission controller is programmed to deduce from the sensor signals an occurrence of a brake slip.

In accordance with another feature of the invention, the brake controller, the transmission controller and the engine torque controller together define a drive-train controller, the drive-train controller prescribing a low transmission gear in a braking assistance operating mode or a manually selected drive mode.

In accordance with a further feature of the invention, the drive-train controller interrupts a power flux in the transmission of the motor vehicle.

In accordance with again a further feature of the invention, the drive-train controller cuts off a fuel supply to the engine in an overrun mode.

In accordance with yet a further feature of the invention, the drive-train controller also downshifts the transmission in the overrun mode.

In accordance with a concomitant feature of the invention, the drive-train controller is programmed to maintain a current transmission gear in addition to cutting off the fuel supply.

The advantages of the invention reside, inter alia, in the fact that a loss of driving stability of the vehicle can be prevented during engine braking and, in particular, when operating with active overrun fuel cut-off. It is also beneficial that, in the event of engine torque control interventions of the controller which occur once or repeatedly, the function of the assistance to the brakes by means of the transmission controller can be rendered passive or else the transmission can be shifted into a higher gear. In this way, only the service brake which is acting on all four wheels is used to decelerate the vehicle. This further improves driving stability in such driving situations.

Other features which are considered as characteristic for the invention are set forth in the appended claims.

Although the invention is illustrated and described herein as embodied in a combined engine and transmission controller of a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
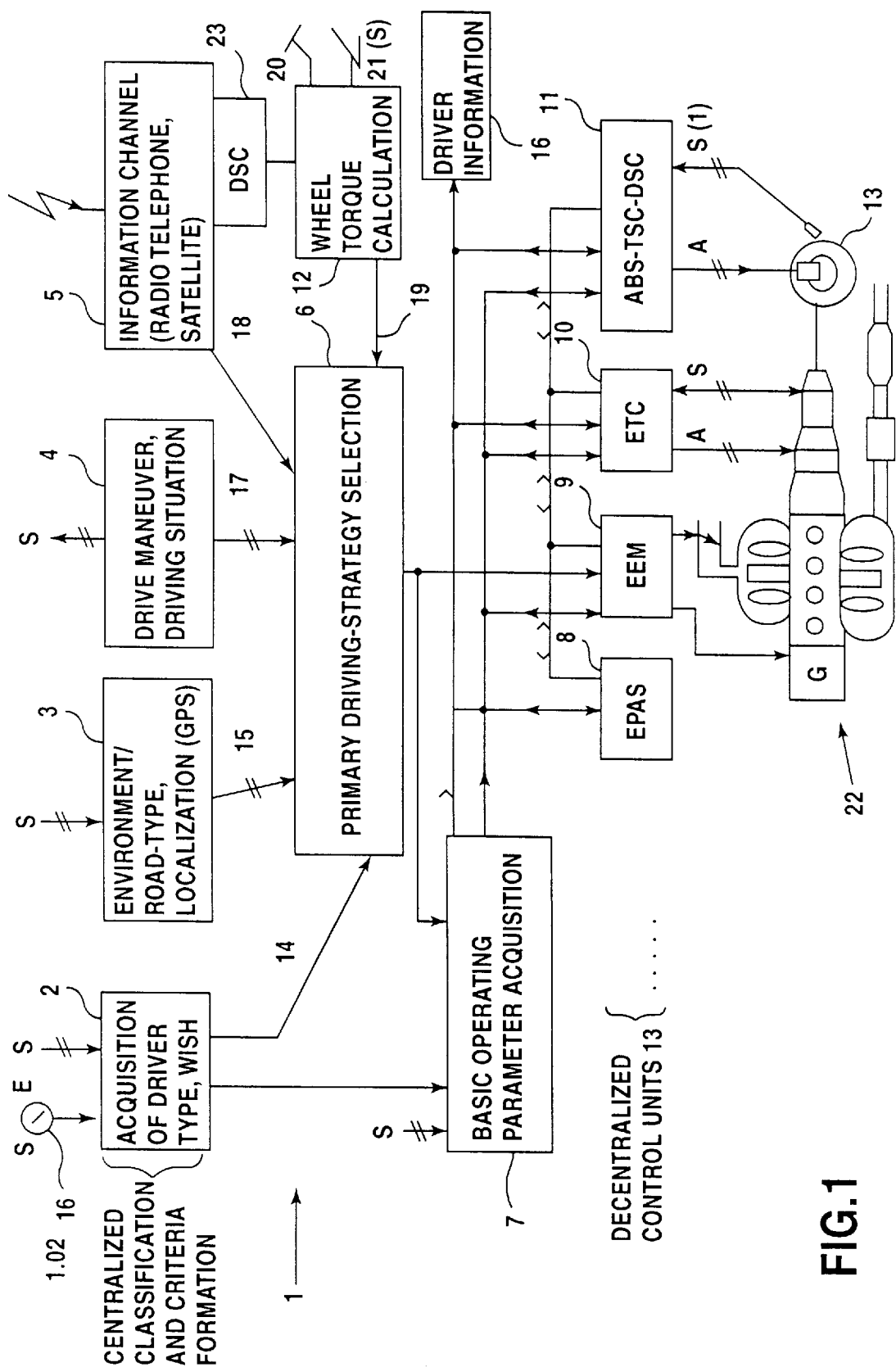
FIG. 1 is a diagrammatic and schematic view of a combined engine and transmission controller in accordance with the invention.

Referring now to the figures of the drawing in detail and first, particularly, to FIG. 1 thereof, there is seen a combined control unit 1 (a controller 1) for the engine and the transmission of a motor vehicle. For purposes of clarity and brevity in the following description, several of the individual circuit components and program components below will be shortened by omitting designations such as "circuit" or "block" (for example: selection instead of selection circuit).

A centralized classification and criteria-forming system 1.02 contains a driver-type and setpoint (driving desires) acquisition system (circuit) 2, an environment, road-type, and localization system 3 (e.g. by means of GPS), a drive-maneuver-detection and driving-situation-detection system 4, and an information channel 5 (for example a radio telephone or a satellite receiver). The signals from various sensors in the motor vehicle, which are designated here generally by S, are fed via appropriate signal lines to the circuits 2 to and further circuit components of the controller 1 to be described below. The signal lines are indicated in the drawing as multiple lines. Instead, the signals may also be carried on a databus.

A primary driving-strategy selection system receives output signals from the circuits 2 to 5 via lines 14, 15, 17 and 18. Via a line 19, the selection system receives the output signal of a wheel torque calculation system 12 which itself receives signals from a brake pedal 20 and an accelerator pedal 21. Output signals of the primary driving strategy selection system 6 are fed to a basic operating parameter acquisition system 7 and an electronic engine controller and engine power actuator 9. Output signals of the basic operating parameter acquisition system 7 are fed to a driver's information system or display 16, to an electric power assisted steering system (EPAS) 8, to the electronic engine control and engine power adjuster (EEM=electronic engine management) 9, to an electronic transmission controller (ETC) 10 and to a brake controller 11, which may include an ABS system, a traction control system TCS and a driving stability controller DSC.

The basic operating parameter acquisition system (or block) 7 then carries out a coordinated calculation of the central operating parameters of the entire drive train in accordance with a strategy specification from the block 6. In the block 7, the transmission ratio and desired engine torque, for example, are specified, but also the drive mode, and its components in the case of a hybrid drive (electric motor and internal combustion engine in a motor vehicle). This permits significantly more comprehensive control of the engine and of the transmission as compared with the prior art. Thus, the engine torque can be set as a function of the transmission ratio. This increases the drivability of the motor vehicle, since the driver no longer has to compensate for the loss of drive torque when shifting up.

The emissions of noxious substances from the motor vehicle can also be effectively reduced, as will be appreciated from the following: The coordinated definition of the operating parameters of the engine and transmission is carried out here not only in steady-state, i.e. not only with a constant wheel torque request by the block 12, but information on dynamic processes, for example on cornering or on a transition to overrun conditions (the vehicle speed is reduced in such a case), is also taken into account by the block 7 in order to control the downstream functional units 8 to 11 in a coordinated fashion. Thus, in the case of overrun conditions it is possible both to maintain the current gear transmission ratio and at the same time to activate the overrun fuel cut-off. In the case of extreme cornering it is advisable, in order to maintain the driving stability, to fix the transmission ratio by means of the transmission controller 10 and to damp the load change in the drive, or to make it occur more slowly, by means of the electronic engine controller and engine power actuator 9.

However, such centralization as part of drivability management and emission control should be carried out only insofar as it is necessary, specifically by means of a strategy specification or delegation system. All the other functions occur at the level of the decentralized control units and as far as possible independently, for example the functions which ensure driving stability.

The control circuits or devices 8 to 11 produce actuation signals with which the individual components or assemblies of the drive train 24 of the motor vehicle are controlled, i.e. the engine via its throttle valve or an electromotive power controller, the transmission and the brakes of the motor vehicle. The respective actuation signals are fed via lines A from the circuits 9–11 to the components of the drive train. Sensor signals S are fed to the aforesaid circuits via corresponding lines. The control circuits or devices 8–11 can, however, also be assembled as so-called in-situ units with the respective assembly to be controlled, or can be integrated therein. Thus, it is, for example, advisable, in the case of an electric brake actuator, to combine the controller 11 with the brake actuator. However, this does not change the function of the controller at all.

Figure 2:
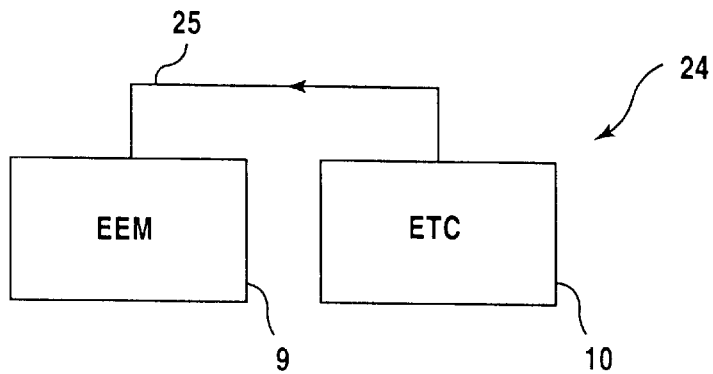
FIG. 2 is a diagrammatic view of a drive-train controller, which forms a part of the controller of FIG. 1 and in which the transmission controller starts an engine torque control intervention via an interface to the engine controller.

Referring now to FIG. 2, a first exemplary embodiment of a drive-train controller (in the narrower sense) 24 of the described combined controller 1 is formed by the electronic engine controller and/or engine power actuator 9 and the electronic transmission controller 10. The engine torque control function is activated by it if, firstly, a brake slip is detected and, secondly, the transmission controller 10 specifies, either in the "braking assistance" braking mode or, in the case of a manually selected drive position, a lower gear than is provided by a shift characteristic diagram for the unbraked mode of the motor vehicle. The brake slip can be signaled to the transmission controller either by means of an ABS-TCS-DSC system, if the motor vehicle is provided with one, or the brake slip can be detected by the latter via its own sensors—sensors for the rotational speed of turbines, the output rotational speed or for the rotational speed of wheels. In this case, the transmission controller 10 starts an engine torque controlled intervention via an interface 25 to the engine controller 9. The engine torque controller intervention in the engine controller 9 brings about an increase in the engine torque into the positive range (i.e. drive) there and thus decreases the brake slip.

Figure 3:
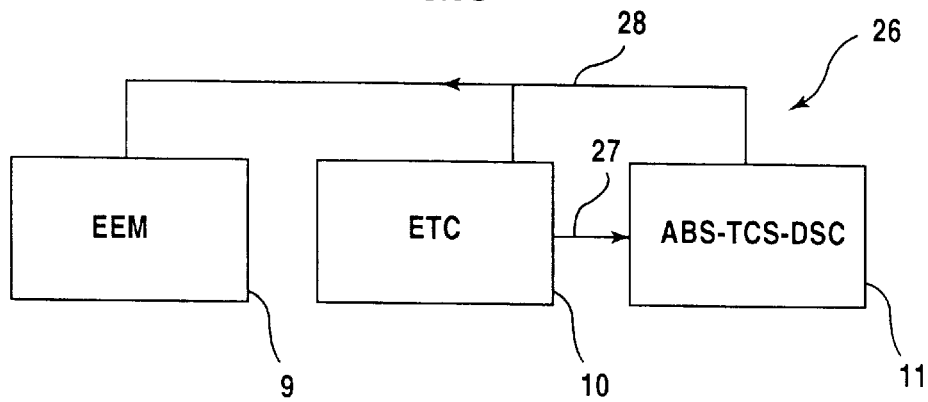
FIG. 3 is a similar view of a different exemplary embodiment of a drive-train controller, in which a brake control unit, which is informed of the "braking assistance" operating mode by the transmission controller, initiates the engine torque control intervention.

Referring now to FIG. 3, in a second exemplary embodiment of a drive-train controller 26, a brake control unit or ABS-TCS-DSC control unit 11 is additionally present, the control unit 11 is informed about the "braking assistance" mode by the transmission controller 10. A corresponding signal is conveyed via a special data line 27 or via a multiple-use multiple data line 28. This enables the engine torque control function to be activated in the ABS-TCS-DSC control unit by means of the information "transmission and/or engine in braking mode", if the transmission controller detects the brake slip but the ABS-TCS-DSC unit triggers the engine torque control intervention centrally. A further possibility is that, in this case, the transmission controller 10 sensitizes the ABS-TCS-DSC unit 11 by informing it of an operating mode "transmission and/or engine in braking mode". This permits a more rapid reaction if brake slip occurs. The term "brake control unit" is understood here in the broader sense as a controller which, with involvement of the vehicle brakes, controls the function of an anti-lock brake system (ABS), a traction control system (TCS) and/or a driving stability controller (DSC).

Figure 4:
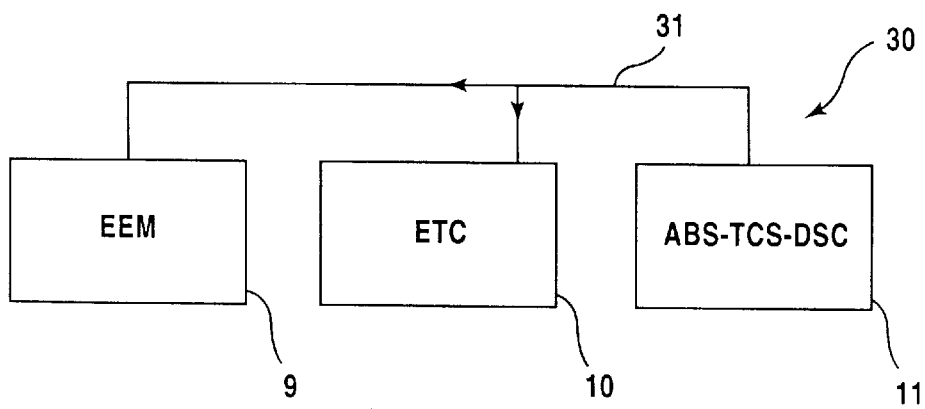
FIG. 4 is a similar view of a further exemplary embodiment of a drive-train controller, in which, in the event of engine torque control interventions, the function of the braking assistance is passivated in the transmission controller or in which the transmission is shifted into a higher gear.

It is also advantageous, in the case of engine torque controller interventions which occur once or repeatedly, to render passive the function of the braking assistance in the transmission controller 10 or else to shift the transmission to a higher gear. This also applies in the case of a shift mode ("tiptronic") which is selected manually by the driver using keys. In a third exemplary embodiment of a drive-train controller 30, as illustrated in FIG. 4, this is implemented by virtue of the fact that, when the ABS-TCS-DSC control unit 11 detects an engine torque controller intervention in the engine controller 9 or in the case of a self-triggered engine torque controller intervention, the transmission controller 10 passivates the function of the braking assistance in the transmission controller 10 or else shifts the transmission into a higher gear. In this way, the vehicle is then only decelerated with the service brake, which increases the driving stability of the motor vehicle in such a driving situation.

A further possible way not to transmit the engine brake torque or engine torque to the driven wheels is to interrupt the power flux in the drive train. In such a case, if a brake slip occurs, a clutch in the drive train, for example at or in the transmission, is opened by the transmission controller 10. Either an instruction to open the clutch can be conveyed from the ABS-TCS-DSC control unit 11 to the transmission controller 10, or else the function occurs autonomously in the transmission controller 10, sensor information also being evaluated by the other control units. Finally, it is also possible to open the clutch by means of a non-illustrated, separate clutch controller.

The functions of the drive-train controllers 24, 26 and 30 described above with reference to FIGS. 2–4 can influence the gear calculation system if the system is controlled in the block 7 of FIG. 1. The controllers 24, 26 and 30, however, also permit the drive train to be controlled with a conventional design of the control units, i.e. without a centralized acquisition of the operating parameters.

Another driving situation is if the driver does not want the motor vehicle to decelerate but rather to coast. Such driving behavior is also advisable for reasons of overall efficiency, in order to use the kinetic energy of the motor vehicle for locomotion with as little loss as possible and to avoid reducing this energy by a braking torque of the engine during overrun conditions. In such a case, it is also advisable to interrupt the drive train as described. Such driving behavior is, however, greatly modified in comparison with that of a drive train which is controlled as usual, and is not always accepted by the driver. The vehicle no longer has an engine braking effect, since the drive train is always interrupted in the state "engine idling, vehicle unbraked/coasting". Since this can be very disruptive in cases in which an engine braking effect is necessary, for example when driving downhill, environmental information, such as the control system according to FIG. 1 makes available, is included (see following table, column A) in the control of the coasting mode, which is also referred to as momentum-utilization mode.

From the following table it is also clear that the information on driver classification, driving maneuver, driving-situation detection, environment-type/street-type, localization, if appropriate with GPS, is made available by the controller 1. An item of information relating to vehicles ahead or to stationary obstacles is very beneficial if the motor vehicle is provided with an automatic driving speed regulator with obstacle detection system and if the information is supplied thereby.

| A | B | C | D |
|---|---|---|---|
| Momentum utilization mode ("coasting") | Engine under overrun conditions, overrun fuel cut-off (up-shifting permitted) | Engine under overrun conditions, overrun fuel cut-off, maintain gear | Engine under overrun conditions, overrun fuel cut-off, brake assistance (shifting down takes place) |
| No stationary obstacle ahead | Approaching moving obstacle | Approaching stationary obstacle, vehicle decelerates, severe reduction in pressure on accelerator pedal | Approaching stationary obstacle, driver brakes |
| Driving downhill, unbraked[1] straight section of rod | | Driving downhill, complete removal of pressure from accelerator pedal | Driving downhill in braked fashion |
| Economic driving style Driving straight ahead, flat | Normal driving style Country road, windy | Slightly sporty driving style Country road, windy, severe reduction in pressure on accelerator pedal | Sporty driving style Country road, windy, hilly, driver brakes |

[1] unbraked means not actively braked by driver.

A driving state such as the one illustrated in column B of the table occurs when the motor vehicle approaches a moving obstacle, the driving style of the driver is normal, (i.e. neither particularly economic nor particularly sporty) and the country road on which he is traveling is windy, so that the engine is operated under overrun conditions and overrun fuel cut-off is carried out, shifting up of the transmission being permitted.

In a driving state according to column C of the table, the vehicle approaches a stationary vehicle and must therefore be decelerated. The pressure on the accelerator pedal is severely reduced. If a vehicle is traveling downhill, the pressure on the accelerator pedal is completely removed. In the case of a slightly sporty driving style, windy country road and a severe reduction in pressure on the accelerator, the engine is operated under overrun conditions, overrun fuel cut-off is carried out and the transmission gear or the transmission ratio (for example in the case of an infinitely variable transmission) is maintained. In a driving situation according to column D of the table, the motor vehicle approaches a stationary obstacle and the driver brakes, or else he or she brakes when going downhill. In the case of a sporty driving style, a windy and hilly country road and a driver who is braking, the engine is operated under overrun conditions, overrun fuel cut-off is carried out and the transmission controller provides braking assistance by shifting down.

Fuel is saved where the overrun fuel cut-off of an internal combustion engine is activated as often as possible. This activation takes place expediently using the information which is supplied by the blocks 2–5 of the controller 1.

In conventional motor vehicles, the engine controller decides on the activation of the overrun fuel cut-off independently of environmental conditions such as the gradient of the road and state of the vehicle. Engine-related parameters such as engine speed and throttle-valve position are usually used for this, and the overrun fuel cut-off is effected with the aid of a characteristic curve. From the table it is clear that, in the case of the present controller, the driving style of the driver is also included. Thus, an economically oriented driver will adopt a predictive way of driving, which, wherever possible, avoids the need for drastic braking maneuvers. Such a driver will accept the momentum-utilization mode in accordance with column A. However, if there is an obstacle ahead which the motor vehicle is approaching with appreciable relative speed, this corresponds to one of the driving situations in columns C or D with overrun fuel cut-off. Here, the vehicle decelerates with a severe reduction of pressure on the accelerator pedal and, if appropriate, with the gear being maintained.

The function "maintain gear" assumes a driving situation in which the driver wants a braking effect from the drive train without activating the service brake. For this reason, the drive-train controller avoids shifting up despite a reduction of pressure on the accelerator pedal. The motor is definitely made to operate under overrun conditions.

The approaching of bends can be detected in a more costly way with appropriate sensors or by means of an item of GPS information and a comparison with a digital road maps With such technical means, it is possible to envisage or predict driving maneuvers which are due to the environment, such maneuvers permitting overrun fuel cut-off and assisting the driver.

If the braking assistance state occurs, it is appropriate in all cases to place the engine in overrun fuel cut-off mode.

The driver's driving style plays a large part in his or her acceptance of the driving strategies according to columns A to D of the table. Thus, a driving performance-oriented driving style will harmonize better with a decelerating behavior of the vehicle than with a freewheeling effect such as is found with an automatic momentum-utilization mode.

The exemplary embodiments may be summarized as follows: The combined engine and transmission controller 1 for a motor vehicle uses the position of the accelerator pedal 21 to calculate setpoint values for the engine and the transmission of the motor vehicle. The controller 1 has a drive-train controller 24, 26 or 30 which, when the engine is not in traction mode, controls the driving mode of the motor vehicle so as to adapt it to the surroundings of the motor vehicle and to the driving style of the driver. The drive-train controller activates an engine torque controller when a brake slip is detected, and the transmission controller 10 prescribes a lower gear than is provided for the unbraked mode of the motor vehicle by a characteristic diagram.

I claim:

1. A drive-train control system for a motor vehicle in which a position of an accelerator pedal is utilized to calculate setpoints for an engine and a transmission of the motor vehicle, the control system comprising:

a combined control unit for the engine and the transmission of the motor vehicle;

said control unit being programmed to, when the engine is not in traction mode, adapt a driving mode of the motor vehicle to surroundings of the motor vehicle and to a driving style of the driver; and an engine torque control device, said device being programmed to activate an engine torque controller when both a brake slip is detected and a transmission controller prescribes a lower gear than a gear predetermined according to a characteristic diagram for an unbraked drive mode of the motor vehicle.

2. The system according to claim 1, which further comprises a brake controller connected to said transmission controller, said brake controller outputting a signal indicating an occurrence of a brake slip to said transmission controller.

3. The system according to claim 1, wherein said transmission controller receives a plurality of sensor signals from the motor vehicle, and said transmission controller is programmed to deduce from the sensor signals an occurrence of a brake slip.

4. The system according to claim 2, wherein said brake controller, said transmission controller and said engine torque controller together define a drive-train controller, said drive-train controller prescribing a low transmission gear in a braking assistance operating mode or a manually selected drive mode.

5. The system according to claim 2, wherein said brake controller, said transmission controller and said engine torque controller together define a drive-train controller, said drive-train controller interrupting a power flux in the transmission of the motor vehicle.

6. The system according to claim 2, wherein said brake controller, said transmission controller and said engine torque controller together define a drive-train controller, said drive-train controller cutting off a fuel supply to the engine in an overrun mode.

7. The system according to claim 6, wherein said drive-train controller is programmed to cut off the fuel supply to the engine and to downshift the transmission in the overrun mode.

8. The controller according to claim 6, wherein said drive-train controller is programmed to cut off the fuel supply to the engine and to maintain a current transmission gear.

* * * * *